United States Patent
Snyder et al.

(10) Patent No.: US 10,094,229 B2
(45) Date of Patent: Oct. 9, 2018

(54) COOLING SYSTEM OF A STATOR ASSEMBLY FOR A GAS TURBINE ENGINE HAVING A VARIABLE COOLING FLOW MECHANISM AND METHOD OF OPERATION

(71) Applicant: United Technologies Corporation, Hartford, CT (US)

(72) Inventors: Brooks E. Snyder, Glastonbury, CT (US); Michael G. McCaffrey, Windsor, CT (US); Thomas N. Slavens, Vernon, CT (US)

(73) Assignee: United Technologies Corporation, Farmington, CT (US)

(*) Notice: Subject to any disclaimer, the term of this patent is extended or adjusted under 35 U.S.C. 154(b) by 592 days.

(21) Appl. No.: 14/811,122

(22) Filed: Jul. 28, 2015

(65) Prior Publication Data
US 2016/0153291 A1  Jun. 2, 2016

Related U.S. Application Data

(60) Provisional application No. 62/029,700, filed on Jul. 28, 2014.

(51) Int. Cl.
*F01D 5/08* (2006.01)
*F01D 9/02* (2006.01)
(Continued)

(52) U.S. Cl.
CPC ............. *F01D 9/023* (2013.01); *F01D 5/082* (2013.01); *F01D 17/162* (2013.01); *F02C 7/18* (2013.01);
(Continued)

(58) Field of Classification Search
CPC . F01D 5/08; F01D 5/081; F01D 5/082; F01D 9/023; F01D 17/162; F02C 7/18;
(Continued)

(56) References Cited

U.S. PATENT DOCUMENTS 3,224,194 A * 12/1965 De Feo ................ F01D 5/08
                                                    415/115
3,663,118 A    5/1972 Johnson
(Continued)

FOREIGN PATENT DOCUMENTS

| JP | 2011137390 | | 7/2011 |
| JP | 2011137390 A | * | 7/2011 |
| WO | 2015026597 | | 2/2015 |

OTHER PUBLICATIONS

JP 2011137390 A—Translation from Espacenet.*
EP Search Report dated Dec. 15, 2015.

*Primary Examiner* — Woody Lee, Jr.
*Assistant Examiner* — Behnoush Haghighian
(74) *Attorney, Agent, or Firm* — O'Shea Getz P.C.

(57) ABSTRACT

A cooling system integrated into a stator assembly of a gas turbine engine has an on-board injector or cooling nozzle located for cooling of a rotor assembly. The nozzle may be generally annular and may contain a plurality of pivoting airfoils circumferentially spaced from one-another for directing cooling air flow from the nozzle and generally toward a plurality of holes in a cover of the rotor assembly. The pivoting airfoils are adapted to move between a spoiled state where the mass flow of cooling air is reduced, and to an optimal state where the mass flow is increased. The system may further include a plurality of fixed airfoils in the nozzle with adjacent fixed airfoils defining a discharge orifice in the nozzle. Each one of the plurality of pivoting airfoils may be located in a respective discharge orifice.

14 Claims, 5 Drawing Sheets

(51) Int. Cl.
*F02C 7/18* (2006.01)
*F01D 17/16* (2006.01)
*F01D 9/06* (2006.01)

(52) U.S. Cl.
CPC .............. *F01D 5/08* (2013.01); *F01D 5/081* (2013.01); *F01D 9/065* (2013.01); *F05D 2220/32* (2013.01); *F05D 2240/81* (2013.01); *F05D 2260/232* (2013.01); *Y02T 50/673* (2013.01); *Y02T 50/676* (2013.01)

(58) Field of Classification Search
CPC ............. F05D 2220/32; F05D 2240/81; F05D 2260/232
See application file for complete search history.

(56) References Cited

U.S. PATENT DOCUMENTS

| | | | |
|---|---|---|---|
| 5,310,319 A | 5/1994 | Grant et al. | |
| 5,402,636 A | 4/1995 | Mize et al. | |
| 5,522,698 A | 6/1996 | Butler et al. | |
| 5,645,397 A | 7/1997 | Soechting et al. | |
| 6,722,138 B2 | 4/2004 | Soechting et al. | |
| 7,713,022 B2 | 5/2010 | Major et al. | |
| 7,806,652 B2 | 10/2010 | Major et al. | |
| 7,927,067 B2 | 4/2011 | Rajamani et al. | |
| 8,007,229 B2 | 8/2011 | McCaffrey et al. | |
| 8,092,157 B2 | 1/2012 | McCaffrey | |
| 8,162,605 B2 | 4/2012 | Alvanos et al. | |
| 8,202,043 B2 * | 6/2012 | McCaffrey | F01D 17/162 415/160 |
| 8,240,983 B2 * | 8/2012 | Suljak, Jr. | F01D 17/162 415/160 |
| 8,517,666 B2 | 8/2013 | Alvanos et al. | |
| 8,562,285 B2 | 10/2013 | McCaffrey et al. | |
| 8,668,445 B2 * | 3/2014 | Crespo | F01D 9/04 415/160 |
| 8,899,924 B2 | 12/2014 | Alvanos | |
| 9,038,398 B2 | 5/2015 | Suciu et al. | |
| 9,062,560 B2 | 6/2015 | Hayford et al. | |
| 9,151,178 B2 | 10/2015 | Holchin et al. | |
| 2015/0275690 A1 * | 10/2015 | McCaffrey | F01D 5/081 416/1 |
| 2017/0037730 A1 * | 2/2017 | Tsuji | F01D 25/12 |

* cited by examiner

COOLING SYSTEM OF A STATOR ASSEMBLY FOR A GAS TURBINE ENGINE HAVING A VARIABLE COOLING FLOW MECHANISM AND METHOD OF OPERATION

This application claims priority to U.S. Patent Appln. No. 62/029,700 filed Jul. 28, 2014.

BACKGROUND

The present disclosure relates to a stator assembly of a gas turbine engine and, more particularly, to a cooling system of the assembly having a variable cooling flow mechanism and method of operation.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust. The turbine section typical includes a stator assembly and a rotor assembly. The stator assembly includes a plurality of vanes that direct hot gases toward a plurality of blades of the rotor assembly. The stator assembly further includes a cooling system often referred to as a tangential on-board injector (TOBI) as one example. The TOBI delivers cooling air to the rotor assembly for cooling of a rotor disk and the attached blades.

Known cooling systems, such as the TOBI, are generally not capable of adjusting cooling air flow. The non-adjustable TOBI typically supplies the rotor assembly with the desired flow at high-power design point. The high-power design point results in a TOBI which may provide too much cooling flow at low power. Overcooling the rotor assembly at low power may increase the transient thermal stress in the rotor assembly resulting in the need for a compensated, heavier, rotor assembly. Thus, there exists a need for improved thermal management of the rotor assembly.

SUMMARY

A variable cooling flow mechanism adapted to be secured to an annular cooling flow nozzle of a stator assembly of a gas turbine engine for controlling the mass flow of cooling air toward a downstream rotor assembly according to one, non-limiting, embodiment of the present disclosure, the mechanism including a plurality of airfoils disposed in the nozzle and spaced circumferentially from one another about an engine axis; and wherein the plurality of airfoils are constructed and arranged to move for controlling cooling air flow mass rate through the nozzle.

Additionally to the foregoing embodiment, the mechanism includes a sync ring centered to the engine axis and constructed and arranged to move the plurality of airfoils simultaneously.

In the alternative or additionally thereto, in the foregoing embodiment, each one of the plurality of airfoils have a gear in operable contact with a set of teeth of the sync ring.

In the alternative or additionally thereto, in the foregoing embodiment, the sync ring is disposed radially outward from the plurality of nozzles.

In the alternative or additionally thereto, in the foregoing embodiment, the mechanism includes a drive linkage constructed and arranged to move the sync ring circumferentially.

In the alternative or additionally thereto, in the foregoing embodiment, the linkage extends radially from the sync ring and through a vane of the stator assembly.

In the alternative or additionally thereto, in the foregoing embodiment, the mechanism includes at least one actuator disposed radially outward of the vane and constructed and arranged to move the linkage.

In the alternative or additionally thereto, in the foregoing embodiment, the actuator is constructed and arranged to rotate the linkage.

In the alternative or additionally thereto, in the foregoing embodiment, the linkage includes a gear in operable contact with a set of teeth of the sync ring for moving the sync ring.

In the alternative or additionally thereto, in the foregoing embodiment, the plurality of airfoils move between a spoiled state and an optimal state.

A cooling system integrated into a stator assembly of a gas turbine engine for flowing cooling air toward a downstream rotor assembly, according to another, non-limiting, embodiment, the system includes an annular nozzle concentric to an engine axis and for flowing cooling air generally toward the rotor assembly; a plurality of fixed airfoils circumferentially spaced from one-another and disposed in the nozzle with adjacent fixed airfoils circumferentially defining a plurality of discharge orifices; and a plurality of pivoting airfoils with each pivoting airfoil disposed in a respective discharge orifice of the plurality of discharge orifices.

Additionally to the foregoing embodiment, each one of the plurality of pivoting airfoils has a leading edge portion projecting outward from a pivoting axis and a trailing edge portion projecting outward from the pivoting axis.

In the alternative or additionally thereto, in the foregoing embodiment, each one of the plurality of pivoting airfoils pivots between a spoiled state and an optimal state with at least one of the leading and trailing edge portions being closer to respective adjacent fixed airfoils when in the spoiled state as opposed to the optimal state.

In the alternative or additionally thereto, in the foregoing embodiment, the system includes a sync ring centered to the engine axis and constructed and arranged to move the plurality of pivoting airfoils simultaneously.

In the alternative or additionally thereto, in the foregoing embodiment, the system includes a drive linkage extending radially outward from the sync ring and constructed and arranged to move the sync ring in a circumferential direction.

In the alternative or additionally thereto, in the foregoing embodiment, the system includes an actuator disposed radially outward from the stator assembly and constructed and arranged to actuate the drive linkage.

In the alternative or additionally thereto, in the foregoing embodiment, the system includes a controller for sending electronic signals to the actuator based on at least one of rotor speed, throttle position, and variable geometry condition.

In the alternative or additionally thereto, in the foregoing embodiment, the plurality of pivoting airfoils are arcuate in cross section.

A method of operating a cooling system of a gas turbine engine to provide cooling air to a turbine section of the gas turbine engine according to another, non-limiting, embodiment includes the steps of moving a plurality of airfoils disposed in a cooling airflow nozzle into a spoiled state when the gas turbine engine is operating at low rotor speed; and moving the plurality of airfoils into an optimal state when the gas turbine engine is operating at cruising speed.

Additionally to the foregoing embodiment, the cooling air flow mass rate is reduced when in the spoiled state.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
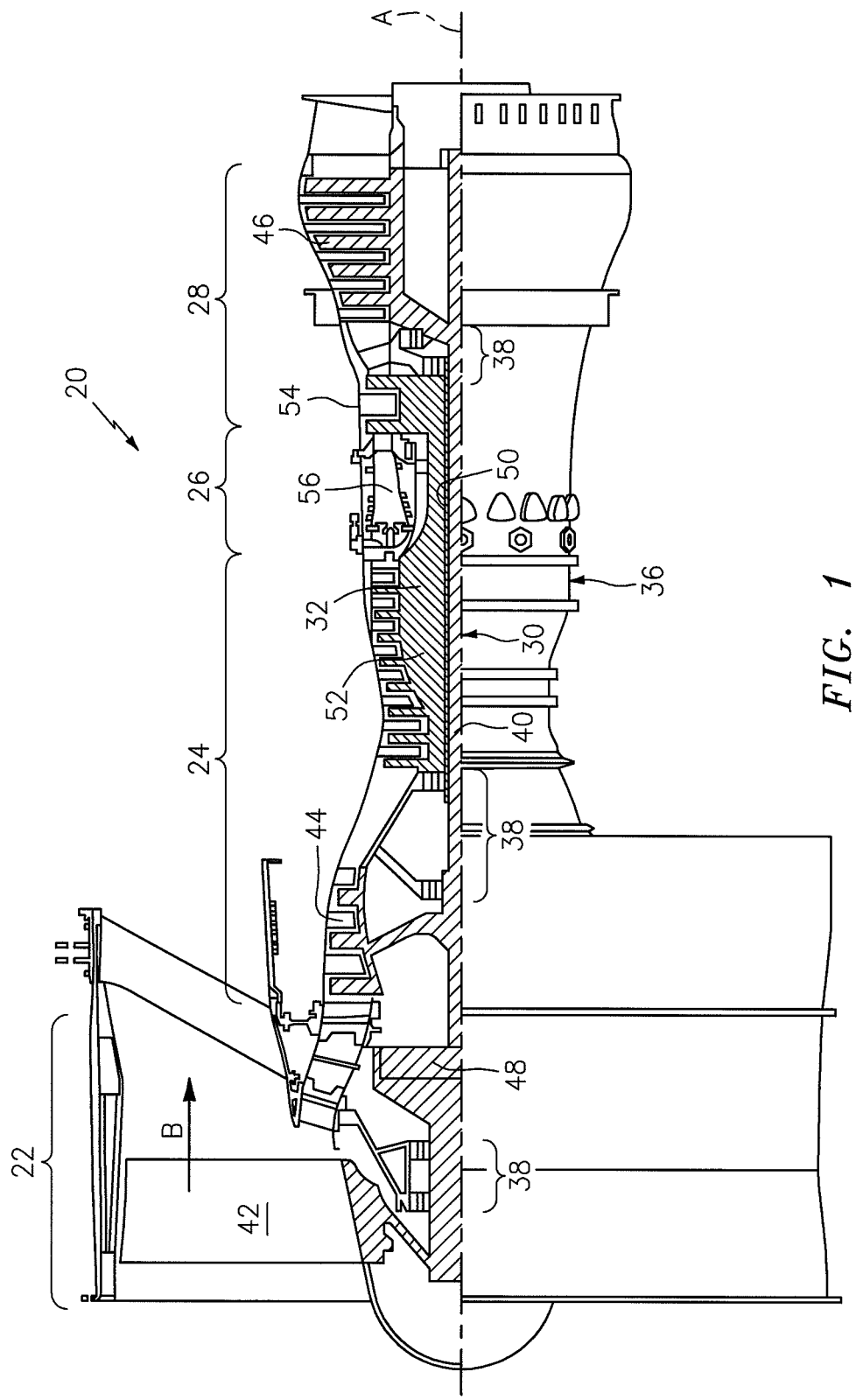
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7)^{0.5}$, where "T" represents the ambient temperature in degrees Rankine. The Low Corrected Fan Tip Speed according to one non-limiting example of the gas turbine engine 20 is less than about 1,150 feet per second (351 meters per second).

Figure 2:
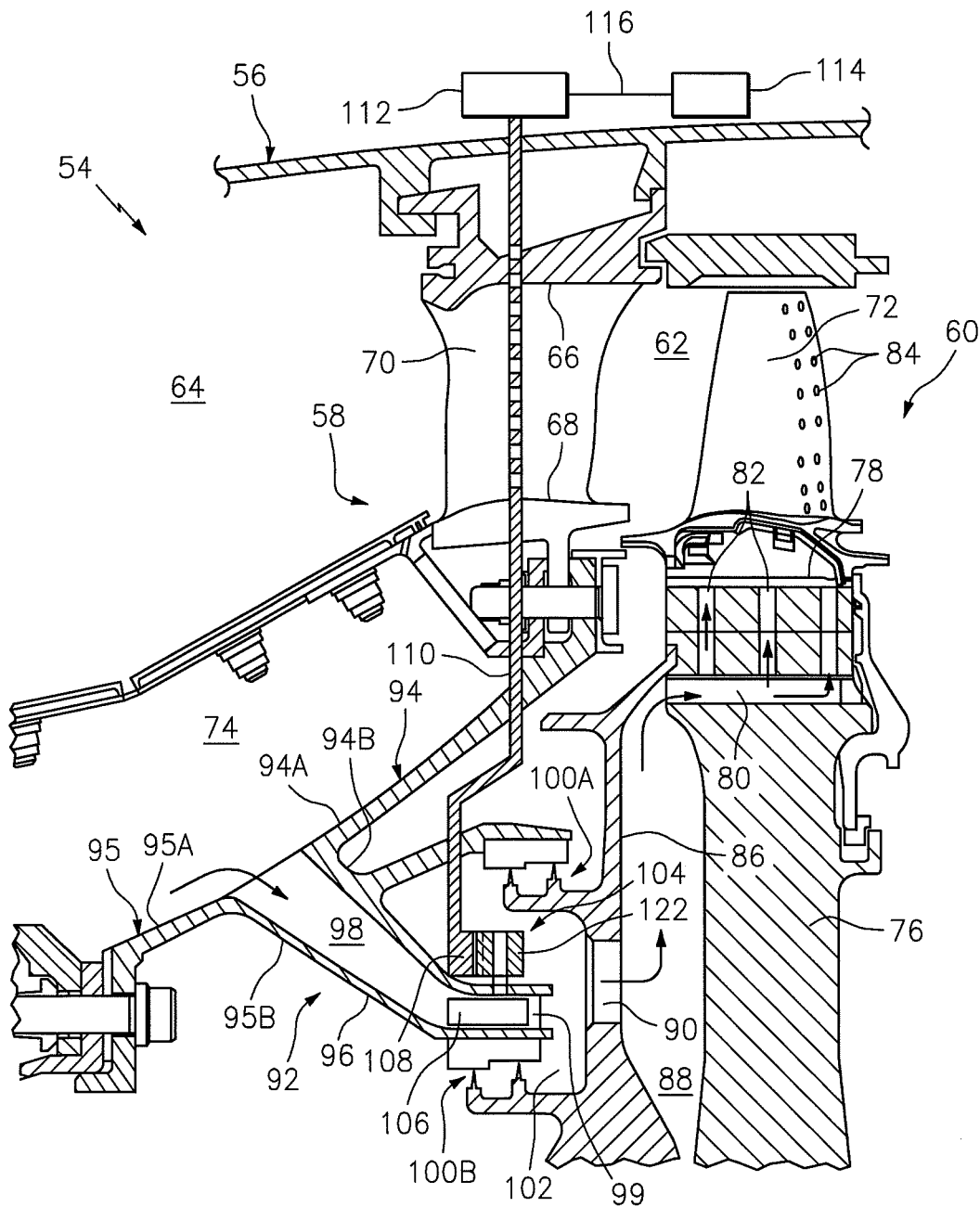
FIG. 2 is partial cross section of a high pressure turbine of the engine illustrating a cooling system according to one, non-limiting, embodiment of the present disclosure.

Referring to FIG. 2, a portion of the HPT 54 of the turbine section 28 is illustrated. The HPT 54 includes a stator assembly 58 and a rotor assembly 60. A flow path 62 for the hot gases is provided downstream of a combustion chamber 64 of the combustor 56, and in-part, defined by the stator assembly 58 including an annular outer flow path wall 66 and an annular inner flow path wall 68. The flow path 62 extends axially between alternating rows of stator vanes, as represented by a single vane 70, and rows of rotor blades, as represented by the single a single blade 72. An annular plenum 74 is formed with the stator assembly 58 and functions, in-part, as a reservoir for turbine cooling air.

Immediately downstream of the row of stator vanes 70 is disposed the row of rotor blades 72. The rotor blades 72 extend radially outward from a supporting rotor disk 76 via respective rotor blade roots 78 that are mounted in the supporting rotor disk 76. A plurality of inlet channels 80 in the rotor disk 76 may be in fluid communication with a plurality of passages 82 in the root 78 for cooling the blades 72. At least a portion of the cooling air flowing through the channels 80, and then the passages 82, may exit a plurality of exit apertures 84 in each blade 72, and into the flow path 62.

A rotor cover 86 of the rotor assembly 60 is located upstream of and rigidly fixed to the rotor disk 76. An annular and radial cavity 88 is defined between the cover 86 and rotor disk 76, and is in upstream fluid communication with the channels 80 for cooling air flow. A plurality of holes 90 are in the cover 86 and are spaced circumferentially from one-another about the engine axis A.

Figure 3:
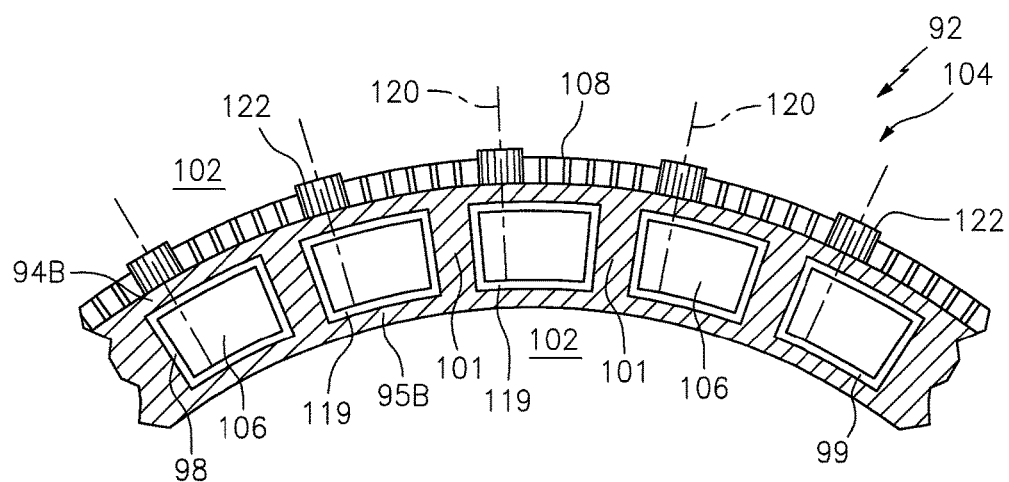
FIG. 3 is a partial cross section of the variable cooling flow mechanism.

Referring to FIGS. 2 and 3, a cooling system 92 of the present invention, as one non-limiting example, is shown as a tangential on-board injector (TOBI), having generally annular first and second walls 94, 95. The first wall 94 has a first portion 94A located generally downstream of a first portion 95A of the second wall 95. The first portions 94A, 95A may generally define in-part the plenum 74. The first and second walls 94, 95 also have respective second portions 94B, 95B that when combined form a generally annular nozzle 96 of the TOBI 92. The nozzle 96 may define an annular cooling air flowpath 98 having a distal or downstream end segment 99 that may be in a substantially tangential relationship with a portion of the cover 86 proximate to the holes 90. The cooling system 92 may further include a plurality of circumferentially spaced stiffening elements or fixed airfoils 101 in the end segment 99 of the flowpath 98, spaced circumferentially from one another, and each one spanning between and engaged to second portions 94B, 95B of the respective walls 94, 95 (see FIGS. 3 and 5).

A plurality of annular seals 100A, 100B (e.g. knife edge seals, two illustrated) may be carried between the cover 86 and the nozzle 96 for generally sealing cooling air within an annular intermediate chamber 102. Seal 100A may be carried between the cover 86 and the second portion 94B of the first wall 94. The seal 100B may be carried between the cover 86 and the second portion 95B of the second wall 95. The intermediate chamber 102 is generally defined by the second portions 94B, 95B and the cover 86. The nozzle flowpath 98 is in direct fluid communication between the plenum 74 and the intermediate chamber 102 that may be in direct fluid communication with the combined holes 90 in the cover 86 of the rotor assembly 60.

Figure 4:
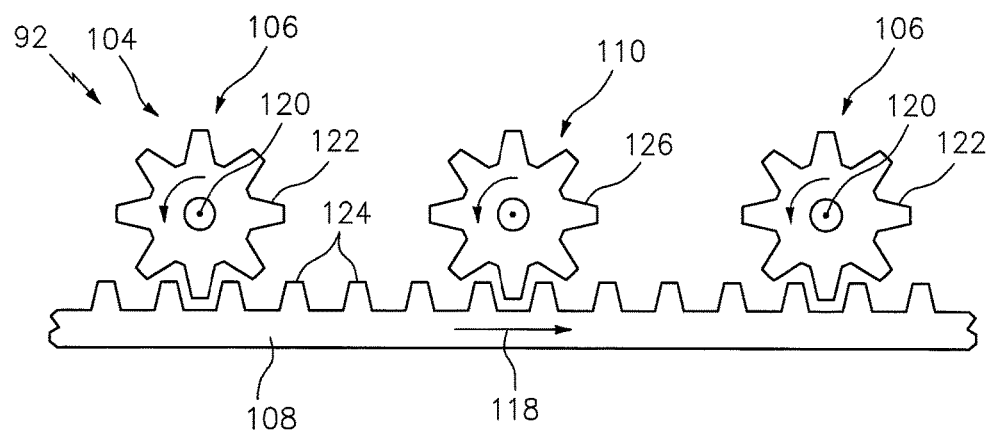
FIG. 4 is a partial plan view of a variable cooling flow mechanism of the cooling system.

Referring to FIGS. 2 through 4, the cooling system 92 further includes a variable cooling flow mechanism 104 having a plurality of pivoting airfoils 106, a sync ring 108, at least one drive linkage 110, at least one actuator 112, and a controller 114 that sends electronic signals 116 to the actuator 112. Each airfoil 106 is, at least in part, moveably mounted in the flowpath 98 of a respective nozzle 96 for spoiling or adjusting the mass and direction of airflow exiting the nozzle. The airfoil 106 is operably engaged to the sync ring 108 that may be located in the intermediate chamber 102 (e.g. radially outward of the nozzles 96 as illustrated). The sync ring 108 is operably engaged to the drive linkage 110 such that the linkage may move the sync ring 108 in a circumferential direction (see arrow 118 in FIG. 4) that, in-turn, moves all of the airfoils 106 simultaneously. The drive linkage 110 is moved or actuated by the actuator 112 that may be located radially outward of the wall 66 and/or engine casing. The actuator 112 is adapted to receive commands from the controller 114 through the signals 116 and as generally dictated by predetermined engine performance and/or operating conditions. The drive linkage 110 may further extend through one of the vanes 70 so as not to obstruct airflow in the flow path 62. It is further contemplated and understood that more than one drive linkage 110 may be applied and may be circumferentially spaced about the engine axis A. Furthermore, the sync ring 108 may be circumferentially divided into segments each having a dedicated drive linkage and a dedicated actuator.

Referring to FIGS. 3 and 4, and as one, non-limiting, example, each airfoil 106 may be pivotally mounted within respective discharge orifices 119 of the annular nozzle 96. Each orifice 119 is generally defined radially by the second portions 94B, 95B and circumferentially by adjacent fixed airfoils 101. The operable airfoils 106 pivot about an axis 120, and each may include a gear 122 located outside of the nozzle and adjacent the second portion 94B of the first wall 94 and within the intermediate chamber 102. The gears 122 may mate with a set of teeth 124 of and on the sync ring 108. Similarly, a gear 126 of the drive linkage 110 may mate with the teeth 124 of the sync ring 108 to drive the sync ring in the circumferential direction 118 as the drive linkage is rotated by the actuator 112. It is contemplated and understood that any driving means may be applied to re-orientate the airfoils 106 within the annular nozzle 96 (e.g. lever and/or moment arms). One such driving means is taught in U.S. Pat. No. 8,240,983, filed Oct. 22, 2007, assigned to United Technologies Corporation, Hartford, Conn., and incorporated herein by reference in its entirety. It is further contemplated and understood that the annular nozzle 96 may, instead, be a plurality of nozzles spaced circumferentially from one-another with each nozzle containing a respective airfoil 106.

Figure 5:
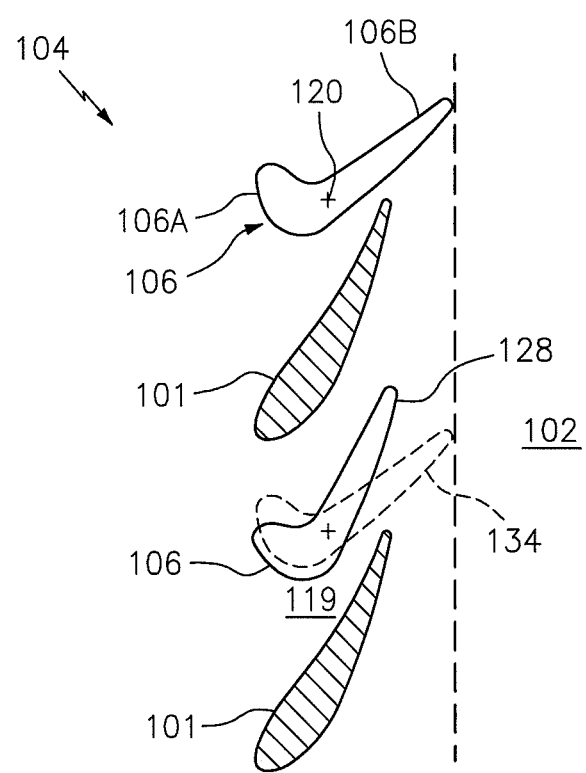
FIG. 5 is a partial cross section of the cooling flow mechanism illustrating fixed and pivoting airfoil positions.
Figure 6:
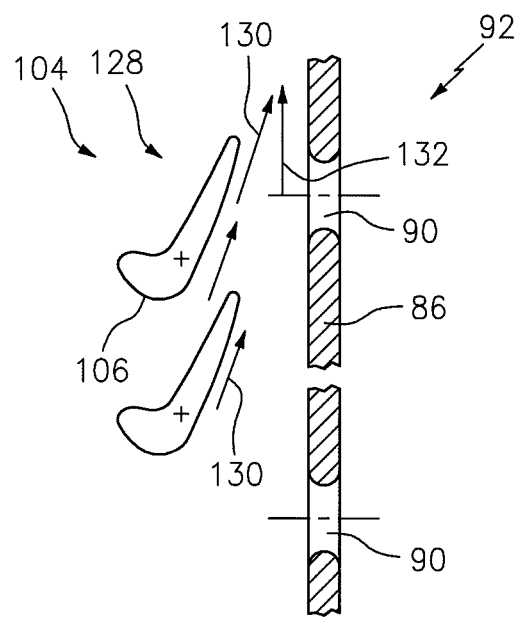
FIG. 6 is a partial cross section of the cooling flow mechanism with the fixed airfoils removed to show detail, and in an optimal state.

Referring to FIGS. 5 and 6, each movable airfoil 106 may have an arcuate cross section taken normal to the pivot axis 120, a leading edge portion 106A and a trailing edge portion 106B (Note that in FIG. 6, the fixed airfoils are not shown in order to show further detail.). The pivot axis 120 is generally between the leading and trailing edge portions 106A, 106B such that when the airfoils 106 pivot toward an optimal state 128, the leading edge portion 106A moves away from an adjacent fixed airfoil 101 and the trailing edge portion 106B moves away from the next adjacent fixed airfoil 101, thereby increasing the cooling air flow cross sectional area at the discharge orifice 119. The pivot axis 120 may further be orientated at or generally closer to the leading edge of the airfoil 106 than the trailing edge (i.e. the trailing edge portion 106A projects further downstream than the leading edge portion 106A projects upstream).

Referring to FIG. 6, the variable cooling flow mechanism 104 is illustrated in the optimal state 128 with the engine 20 generally at high power. When in the optimal state 128, the airfoils 106 are pivoted such that a discharging cooling airflow (see arrow 130) substantially flows in the same circumferential direction (see arrow 132) as the rotation of the cover 86 (i.e. rotor assembly 60). In optimal state 128, the discharge velocity of the cooling airflow 130 is substantially equal to the rotational speed of the rotor assembly 60 proximate to the holes 90 of the cover 86. The cooling supply pressure is greater than that needed to pressurize the rotor blade cavities, and this excess pressure can be converted into flow velocity by accelerating the cooling flow through an aerodynamically efficient discharge orifice 119 created by the fixed and movable airfoils 101, 106. The discharging cooling airflow 130 'relative temperature' is lower than the supply temperature because the cooling effect of the substantially adiabatic acceleration of the flow through the discharge orifice 119. Because flow is substantially equal in speed to the rotor disk 76, the cooling airflow passes through the holes, with minimal losses, through the rotor cover 86, at the lower 'relative temperature' and provides a greater cooling effect to the turbine blades, than if no TOBI 92 was used. The term 'relative temperature' means the temperature of cooling air that reaches the rotor disk 76 of the rotor assembly 60, measured in the (rotating) coordinate system, relative to the rotor assembly.

Figure 7:
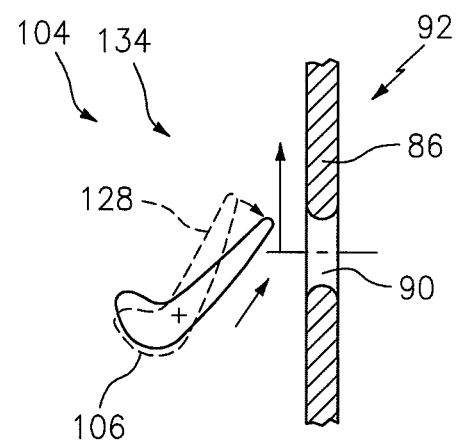
FIG. 7 is a partial cross section of the cooling flow mechanism with the fixed airfoils removed to show detail, and in a spoiled state.

Referring to FIGS. 5 and 7, the variable cooling flow mechanism 104 is illustrated in a spoiled state 134 with the engine generally at low power (e.g. idle and/or low rotor assembly speed). When in the spoiled state 134, the airfoils 106 are pivoted such that the flow cross sectional area at the discharge orifice 119 is reduced, and the discharging cooling airflow 130 is more incident to the cover 86 rotational direction 132 (i.e. more normal to the cover 86). In the spoiled state 134, the cooling air pressure drop across the nozzle 96 is accomplished with adjacent airfoil geometry that approximates a blunt-edged (non-adiabatic) orifice, thus the pressure is reduced, but the temperature exiting the nozzle 96 is equal or greater than the cooling supply temperature. The cooling flow exiting the nozzle 96 is traveling circumferentially slower than the rotor disk 76 and additional mixing losses are incurred, as well as an increase in the temperature of the flow, due to frictional losses as the flow enters the rotor cover holes 90. Thus the 'relative temperature' of the discharging cooling airflow 130 entering the rotor and the blade is even higher than the temperature of the cooling source. In general, the term "spoiled" is used to represent losses in a cooling air system such that pressure is generally traded for increased temperature.

Figure 8:
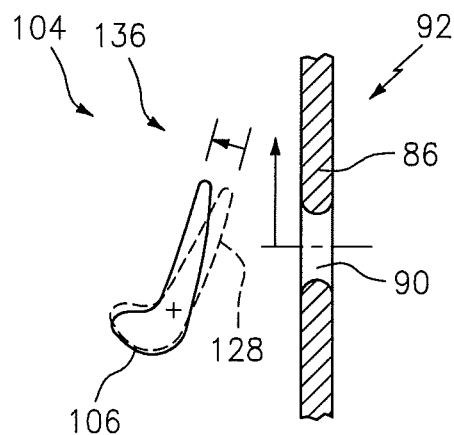
FIG. 8 is a partial cross section of the cooling flow mechanism with the fixed airfoils removed to show detail, and in a throttled state.

Referring to FIGS. 5 and 8, the variable cooling flow mechanism 104 is illustrated in a throttled state 136 with the engine generally at cruising speed and the rotor assembly speed set to high.

In operation of the cooling system 92 the controller 114 may receive sensory input such as rotor speed and/or throttle position. When this input indicates low engine speed or idle conditions, the controller 114 instruct the actuator 112 to move the airfoils 106 into the spoiled state 134 thereby reducing cooling air mass flow rate to the rotor disk 76 and thus preventing over-cooling of the disk. As the engine speed increases, the controller 114 sends a signal 116 to the actuator 112 to move the airfoils 106 from the spoiled state 134 and toward the optimal state 128 for generally normal cruising speed conditions. This movement increases the flow cross sectional area of the discharge orifices 119 allowing more cooling air to reach and cool the rotor disk 76 and ultimately the blades 72. By tailoring thermal loads in this way, less thermal stress is placed upon the rotor disk 76 thus enabling the manufacture of lighter disks.

It is further contemplated and understood that the sensory input may include 'variable geometry condition' as a control parameter to balance secondary flow and rotor purge conditions on a variable cycle engine with variable geometry. Furthermore, the variable geometry may assist in controlling air pressure and purging inter-rotor cavities. In operation, and with a variable TOBI, the flow and pressure may be modulated. For example, this modulation may be performed at high engine power over a designated range of motion. Trimming the flow may occur between aircraft takeoff and cruise condition. Such operation may be done in the 'aerodynamically efficient' operating region of the variable TOBI. During engine deceleration to idle, the flow may be spoiled (i.e. spoiled state 134) and for the alternative reasons previously described.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. For instance, the above description is related in terms of an axially flowing, Tangential On-Board Injector (TOBI); however, it is understood that the desired flow modulation effects described herein, would equally apply to either a Radial On-Board Injector (ROBI) or an Angled On-Board Injector (AOBI). It is therefore understood that within the scope of the appended claims, the disclosure may be practiced other than as specifically described. For this reason, the appended claims should be studied to determine true scope and content.

What is claimed is:

1. A variable cooling flow mechanism adapted to be secured to an annular cooling flow nozzle of a stator assembly of a gas turbine engine for controlling the mass flow of cooling air toward a downstream rotor assembly, the mechanism comprising:
    a plurality of airfoils disposed in the nozzle and spaced circumferentially from one another about an engine axis, wherein at least some of the plurality of airfoils are constructed and arranged to move for controlling cooling air flow mass rate through the nozzle;
    a sync ring centered to the engine axis and constructed and arranged to move the at least some of the plurality of airfoils simultaneously;
    a drive linkage constructed and arranged to move the sync ring circumferentially, wherein the drive linkage extends radially from the sync ring and through a vane of the stator assembly.

2. The variable cooling flow mechanism set forth in claim 1, wherein each one of the plurality of airfoils have a gear in operable contact with a set of teeth of the sync ring.

3. The variable cooling flow mechanism set forth in claim 1, wherein the sync ring is disposed radially outward from the plurality of nozzles.

4. The variable cooling flow mechanism set forth in claim 1, further comprising:
    at least one actuator disposed radially outward of the vane and constructed and arranged to move the linkage.

5. The variable cooling flow mechanism set forth in claim 4, wherein the actuator is constructed and arranged to rotate the linkage.

6. The variable cooling flow mechanism set forth in claim 5, wherein the linkage includes a gear in operable contact with a set of teeth of the sync ring for moving the sync ring.

7. The variable cooling flow mechanism set forth in claim 1, wherein the plurality of airfoils move between a first position and a second position.

8. A cooling system integrated into a stator assembly of a gas turbine engine for flowing cooling air toward a downstream rotor assembly, the cooling system comprising:
- an annular nozzle concentric to an engine axis and for flowing cooling air generally toward the rotor assembly;
- a plurality of fixed airfoils circumferentially spaced from one-another and disposed in the nozzle with adjacent fixed airfoils circumferentially defining a plurality of discharge orifices;
- a plurality of pivoting airfoils with each pivoting airfoil disposed in a respective discharge, orifice of the plurality of discharge orifices, wherein each one of the plurality of pivoting airfoils has a leading edge portion projecting outward from a pivoting axis and a trailing edge portion projecting outward from the pivoting axis, and wherein each one of the plurality of pivoting airfoils pivots between a first position and a second position with at least one of the leading and trailing edge portions being closer to respective adjacent fixed airfoils when in the first position as opposed to the second position; and
- a sync ring centered to the engine axis and constructed and arranged to move the plurality of pivoting airfoils simultaneously.

9. The cooling system set forth in claim 8, further comprising:
- a drive linkage extending radially outward from the sync ring and constructed and arranged to move the sync ring in a circumferential direction.

10. The cooling system set forth in claim 9, further comprising:
- an actuator disposed radially outward from the stator assembly and constructed and arranged to actuate the drive linkage.

11. The cooling system set forth in claim 10, further comprising:
- a controller for sending electronic signals to the actuator based on at least one of rotor speed, throttle position, and variable geometry condition.

12. The cooling system set forth in claim 8, wherein the plurality of pivoting airfoils are arcuate in cross section.

13. A method of operating a cooling system of a gas turbine engine to provide cooling air to a turbine section of the gas turbine engine comprising the steps of:
- moving one or more of a plurality of airfoils disposed in a cooling airflow nozzle into a first position when the gas turbine engine is operating at low rotor speed; and
- moving the one or more of the plurality of airfoils into a second position when the gas turbine engine is operating at cruising speed;
- wherein a sync ring centered to the engine axis is constructed and arranged to move the one or more of the plurality of airfoils simultaneously; and
- wherein each of the one or more of the plurality of airfoils has a gear in operable contact with a set of teeth of the sync ring.

14. The method of operating the cooling system set forth in claim 13, wherein the cooling air flow mass rate is reduced when in the first state.

* * * * *